Figure 1:
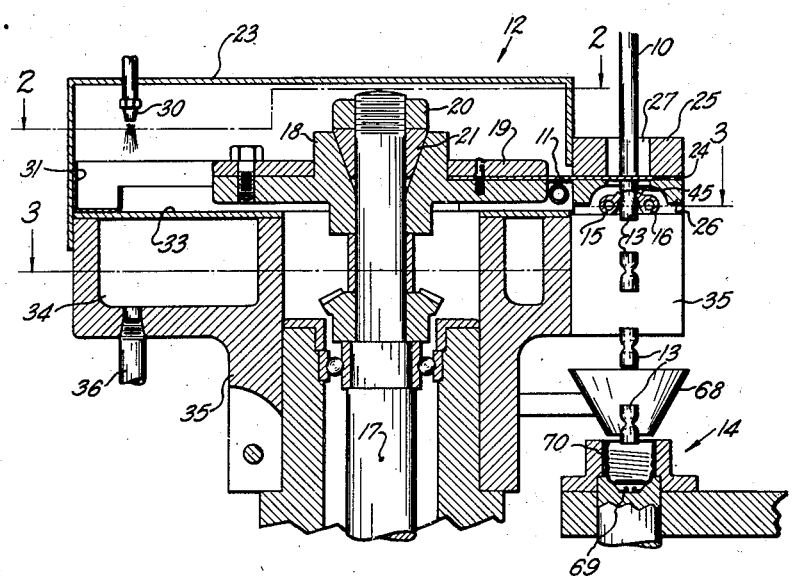

Nov. 9, 1943.  C. A. BROWN ET AL  2,334,064
GLASS FEEDING APPARATUS
Filed May 1, 1940   2 Sheets-Sheet 1

Inventors:
Carl A. Brown,
Charles W. Craig,
by John H. Anderson
Their Attorney.

Nov. 9, 1943. C. A. BROWN ET AL 2,334,064
GLASS FEEDING APPARATUS
Filed May 1, 1940   2 Sheets-Sheet 2

Inventors:
Carl A. Brown,
Charles W. Craig,
by John H. Anderson
Their Attorney.

Patented Nov. 9, 1943

2,334,064

UNITED STATES PATENT OFFICE 2,334,064

GLASS FEEDING APPARATUS

Carl A. Brown, Chardon, and Charles W. Craig, Cleveland Heights, Ohio, assignors to General Electric Company, a corporation of New York Application May 1, 1940, Serial No. 332,792

12 Claims. (Cl. 49—14)

Our invention relates to apparatus for feeding molten gobs of glass or other vitreous material at a high rate of speed and more particularly to apparatus for separating a free falling stream of molten vitreous material into gobs.

At the present time, many shaping machines for vitreous articles require separated quantities or gobs of the vitreous material in order to operate and could be operated at much greater speeds if the gobs could be fed more rapidly. In some instances, the gob type feed is dispensed with altogether in order to increase the speed of operation and the forming apparatus is caused to intercept a free falling stream of the material. In the latter instance, all of the stream cannot be used and the apparatus must be constructed so that the excess material falling thereon while the different parts thereof are moving to and from position below said stream does not interfere with the operation thereof. This method of operation results in a certain amount of waste which is often equal in amount to the material used.

The principal object of our invention is to separate a free falling stream of molten vitreous material into separate quantities or gobs to increase the speed of operation of apparatus for shaping said material.

Another object of our invention is to provide apparatus for severing a molten stream of vitreous material more rapidly at regularly spaced intervals than has been possible heretofore. This may be accomplished, in accordance with our invention, by mounting a plurality of knives on a rotatable turret which is arranged so as to carry the knives against the stream and through a slot in a co-operating cutting block.

Another object of our invention is to provide apparatus for accelerating the movement of the gobs as they are severed from the stream to assist in separating the tail or strings formed during severing and remove said gobs from the path of the stream. The severing operation reduces the speed of movement of the gob somewhat so that the stream would very soon contact and become sealed thereto if it were not moved out of the way thereof. By increasing the speed of movement of the gobs for this purpose, each is separated from the others and can be more readily directed into the portions of the shaping machine advanced into the feeding station.

Other objects and features of our invention will appear from the following detailed description of a species thereof and from the drawings.

Figure 2:
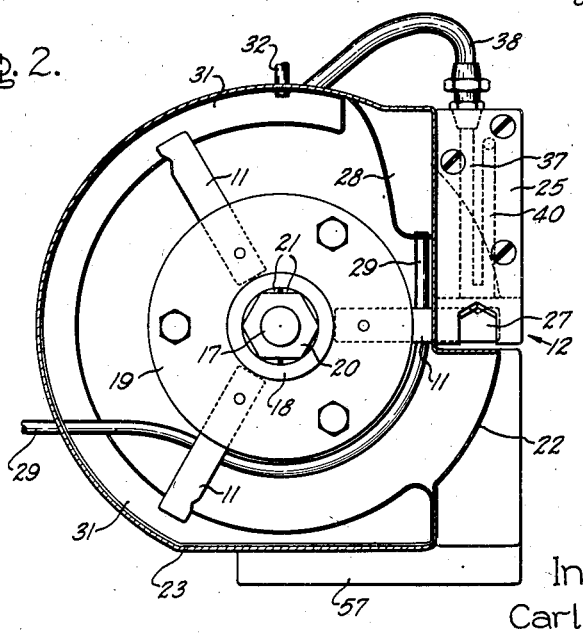
Figure 3:
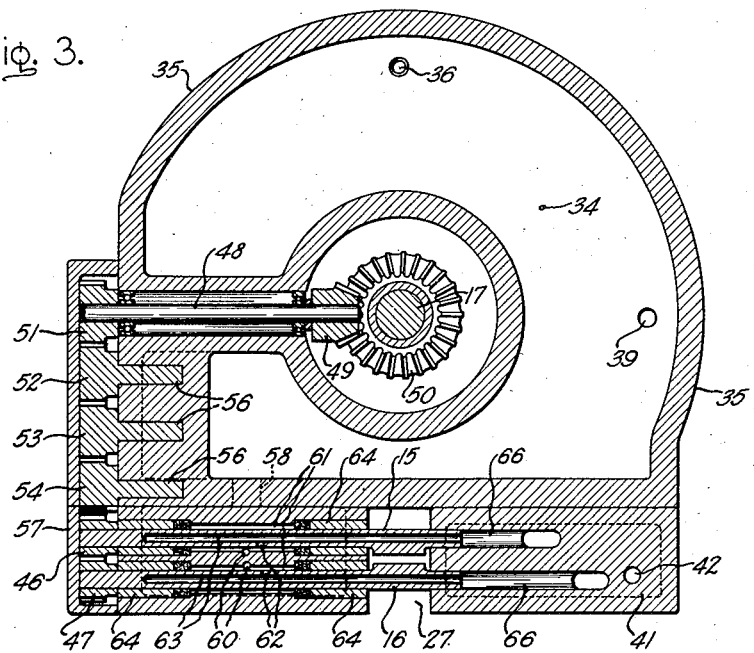
Figure 4:
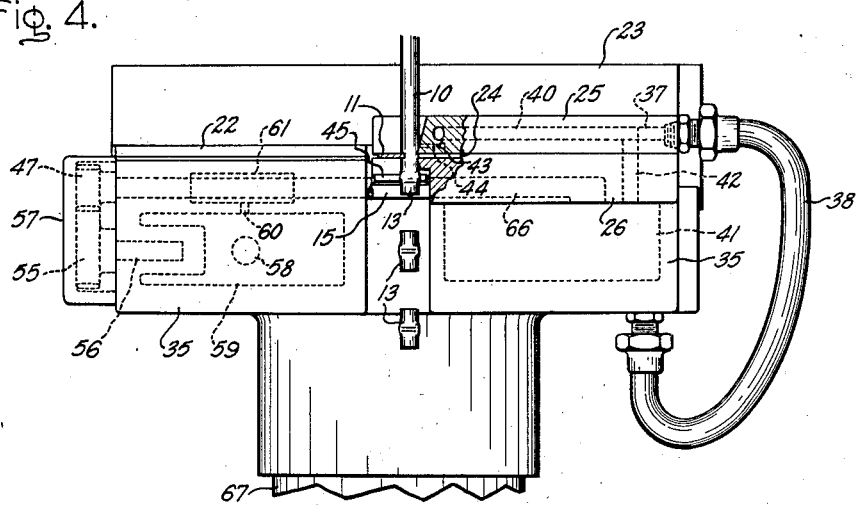

In the drawings, Fig. 1 is a vertical section through the center of a gob-feeding apparatus comprising our invention; Figs. 2 and 3 are horizontal sections through said apparatus along lines 2—2 and 3—3 respectively of Fig. 1 as viewed from the directions indicated; and Fig. 4 is a side elevation of the apparatus.

The particular form of the gob-feeding apparatus shown in the drawings supplies to a lamp base assembling machine the gobs or bodies of glass forming the insulating buttons of said bases. According to our invention, a stream of glass, preferably of circular section and of known size, shortly after issuing from a furnace, is severed at regular intervals by the three rotating knives 11 of the cutting apparatus 12. The gobs 13 formed in this manner are pulled away from the knives 11 and are propelled by the impellers 15 and 16 at nearly twice the rate of movement of the stream to the heads 14 of the base-making machine, which heads are regularly carried into the position shown. The complete feeding operation can be caused to take place so rapidly that 500 or more gobs per minute can be caught by the heads on a constantly rotating turret. In every instance, it is necessary that the operation of the feeding apparatus be synchronized with the operation of the particular forming or shaping apparatus using the gobs 13. In this instance the knives 11 and impellers 15 and 16 are actuated by the drive shaft 17 which is driven by the base assembling machine.

The knives 11 are located in grooves in the turret 18 at 120° intervals and are held therein by the ring-shaped plate 19 attached thereto and are timed to operate with the base assembling machine by adjustment of said turret 18 about the shaft 17 after the nut 20 and wedges 21 have been loosened. The shaft 17 turns the turret 18 in a counter-clockwise direction which carries the knives 11, in turn, through a slot in the outwardly extending portion 22 of the guard 23 and through the slot 24 between the upper and lower cutting blocks 25 and 26 and then against the downwardly flowing molten stream 10 passing through the opening 27 in said blocks 25 and 26. The severing operation in this particular instance consists in shearing from the stream a very narrow section the width of the knives 11 and the slot 24, as the cutting face of the knife 11 is perpendicular to its direction of movement. The succeeding movement of the knife 11 pushes the section severed from the stream through the slot 24, and when the knife 11 emerges therefrom said section drops into the receptacle 28. An air blast from the pipe 29 blows these sections through an opening in the side of the guard 23 to a refuse container located adjacent thereto. The speed of movement of the knife 11 is preferably so rapid that it does not appreciably interfere with the downward movement of the stream 10 and the glass of the stream does not pile up thereon. Cutting speeds sufficient to form five hundred or more gobs per minute are easily provided.

The cooling of the cutting apparatus 12 is done in part by the spray of cooling water directed onto the knives 11 by the nozzle 30 which extends through the top of the guard 23, said water being thrown from the knives 11 by their rotation and collecting in the trough 31. The trough 31 is drained by pipe 32 and rests on the cover 33 over the water-filled chamber 34 of the head 35 of the apparatus which supports the cutting blocks 25 and 26 and provides for their cooling. The water is introduced into the chamber 34 through the pipe 36 and is introduced into a longitudinal passage 37 (Fig. 2) in the upper cutting block 25 through the pipe 38 which is connected to the end of said passage 37 and to an opening 39 in the bottom of the chamber 34. A transverse passage adjacent the cutting face of the block 25 conducts the cooling water to a second longitudinal passage 40 which is drained to the separate chamber 41 below the lower cutting block 26 by means of the hole 42. The chamber 41 discharges to a drain (not shown) and, together with cooling means for the impellers 15 and 16, cools the lower cutting block 26.

As the knives 11 fit snugly in the slot 24, lubrication is furnished thereto from an oil cup (not shown) mounted on the upper cutting block 25 which feeds to the transverse passage 43 (Fig. 4) therein which in turn is drained by two passages 44 terminating in the angular cutting faces of the block 25 in the opening 27. The lubricant flows down these cutting faces to the knives 11.

The severing operation tends to reduce the speed of the downward movement of the gobs 13 so that they would ordinarily be contacted by the end of the stream 10 if it were not for the impellers 15—16 which engage and force them downward more rapidly. Each of the impellers 15 and 16 comprises a tube supported by the lower cutting block 26 and a portion of the head 35 of the apparatus at the opposite side of the opening 27, and engages the gobs 13 through a tooth 45. As the stream 10 is being severed, the teeth 45 engage and are pressed into the gob 13 which is being formed, so that a firm grip is had on said gob 13 although it is somewhat deformed. The impellers 15 and 16 rotate in opposite directions due to the intermeshing gears 46 and 47 on one end thereof and are preferably rotated at such speed as to substantially double the rate of movement of the gob 13. In the particular instance illustrated, five hundred gobs are formed from a stream moving downward at 35 feet per minute and the impellers increase the rate of movement to approximately 80 feet per minute.

In order that the movements of the impellers 15 and 16 be timed with the movements of the cutting knives 11, they are actuated by the drive shaft 17 which, as shown in Fig. 3, engages the shaft 48 carried by the head 35 through the bevel gears 49 and 50, which shaft in turn drives the gear 46 on impeller 15 through the train of gears 51, 52, 53, 54 and gear 55 (the latter being indicated in dotted lines in Fig. 4). The gears 52, 53, 54 and 55 are supported by studs 56 turning in the head 35 and, together with the gears 46, 47 and 51, are enclosed in a case 57 attached to said head 35. Like the other portions of the apparatus, the impellers are cooled, the cooling water being that flowing through the opening 58 from chamber 34 to the side chamber 59 below the one end of the impellers 15 and 16 and up through the passages 60 to the openings 61 about said ends. From here the water passes through openings 62 and into the hollow interior 63 of said impellers 15 and 16. Packing at opposite ends of the openings 62 keeps the cooling water from leaking out, and the bushings 64 in the head 35 keep the packing in place and provide bearings for the ends of the impellers 15 and 16 carried thereby. The continuations of the passages 66, in which the opposite ends of the impellers are supported, conduct the water away therefrom and assist in cooling the lower cutting block 26. These passages 66 drain into the chamber 41 in the head 35. The standard 67 (only partially shown) supports the head 35 and therefore furnishes full support for the apparatus of our invention.

A funnel 68 is preferably mounted between the feeding apparatus and the apparatus receiving the gobs 13, in this case the base assembling machine, in order to assure positive insertion of the gobs therein. The head 14 of the base assembling machine receiving the gob 13 already supports the metal eyelet and shell 69 and 70 respectively of the base, and the gob 13 is pressed down in the head about portions thereof to the form desired after movement of the head from under the feeding machine.

What we claim as new and desire to secure by Letters Patent of the United States is:

1. Apparatus for forming gobs from a molten stream of vitreous material comprising a slotted cutting block mounted adjacent the path of travel of the stream, a rotatable turret mounted on a fixed axis adjacent thereto, and a plurality of spaced radially extending knives mounted on said turret in fixed spacial relationship and arranged to be rotated by said turret in the same direction so that they pass successively through the path of travel of the stream and the slot in the cutting block at succeeding intervals to sever said stream into gobs.

2. Apparatus for forming gobs from a molten stream of vitreous material comprising a slotted cutting block mounted adjacent the path of travel of the stream and having passages therein for the circulation of a cooling fluid, a rotatable turret mounted on a fixed axis adjacent thereto, and a plurality of spaced radially extending knives mounted on said turret in fixed spacial relationship and arranged to be rotated by said turret in the same direction so that they pass successively through the path of travel of the stream and the slot in the cutting block at succeeding intervals to sever said stream into gobs.

3. Apparatus for forming gobs from a molten stream of vitreous material comprising a slotted cutting block mounted adjacent the path of travel of the stream and having passages therein for the circulation of a cooling fluid and other passages terminating in the face thereof adjacent the stream at a point above the slot for the distribution of a lubricant to said slot, a rotatable turret mounted on a fixed axis adjacent thereto, and a plurality of spaced radially extending knives mounted on said turret in a fixed spacial relationship and arranged to be rotated by said turret in the same direction so that they pass successively through the path of travel of the stream and the slot in the cutting block at succeeding intervals to sever said stream into gobs.

4. Apparatus for forming gobs from a molten stream of vitreous material comprising a slotted cutting block mounted adjacent the path of travel of the stream, a rotatable turret mounted on a fixed axis adjacent thereto, a plurality of spaced radially extending knives mounted on said turret in fixed spacial relationship and arranged to be rotated by said turret in the same direction so that they pass successively through the path of travel of the stream and the slot in the cutting block at succeeding intervals to sever said stream into gobs, and a receptacle mounted below the said slot in the cutting block and adjacent the face thereof from which the knives emerge for receiving the waste material cut from the stream.

5. Apparatus of the class described comprising means for severing a molten stream of vitreous material at regular intervals to form gobs of the material, and separate mechanical impeller means engaging the gobs at definite predetermined intervals and increasing their rate of movement in the normal direction of travel of the stream to a speed appreciably greater than that of the stream, and mechanism for actuating said severing means and said impeller means in proper time relation.

6. Apparatus of the class described comprising means for severing a molten stream of vitreous material at regular intervals to form gobs of the material, a pair of impellers located at opposite sides of the gobs formed in this manner, and means for actuating the impellers to cause them to engage each gob and accelerate its movement in the normal direction of travel of the stream to a speed appreciably greater than that of the stream, and mechanism for actuating said severing means and said impellers in proper time relation.

7. Apparatus of the class described comprising means for severing a molten stream of vitreous material at regular intervals, a pair of impellers having teeth thereon and located at opposite sides of the gobs formed in this manner, and means for rotating said impellers to cause the teeth to engage each gob and accelerate its movement in the normal direction of travel of the stream to a speed appreciably greater than that of the stream, and mechanism for actuating said severing means and said impellers in proper time relation.

8. Apparatus of the class described comprising means for severing a molten stream of vitreous material at regular intervals, a pair of impellers located at opposite sides of the gobs formed in this manner and having a passage for conducting a cooling fluid therethrough, and means for actuating the impellers to cause them to engage each gob and accelerate its movement in the normal direction of travel of the stream to a speed appreciably greater than that of the stream, and mechanism for actuating said severing means and said impellers in proper time relation.

9. Apparatus for forming gobs from a molten stream of vitreous material comprising a slotted cutting block mounted adjacent the path of travel of the stream, a rotatable turret mounted adjacent thereto, a plurality of knives mounted on said turret and arranged to be moved by said turret through the path of travel of the stream and the slot in the cutting block at succeeding intervals to sever said stream into gobs, and mechanical impeller means engaging said gobs for accelerating their movement in the normal direction of travel of the stream to a speed appreciably greater than that of the stream, and mechanism for actuating said knives and said impeller means in proper time relation.

10. Apparatus for forming gobs from a molten stream of vitreous material comprising a slotted cutting block mounted adjacent the path of travel of the stream, a rotatable turret mounted adjacent thereto, a plurality of knives mounted on said turret and arranged to be moved by said turret through the path of travel of the stream and the slot in the cutting block at succeeding intervals to sever said stream into gobs, a pair of impellers having teeth thereon and located at opposite sides of a gob formed in this manner, and means for rotating said impellers to cause the teeth to engage the gob and accelerate its movement in the normal direction of travel of the stream to a speed appreciably greater than that of the stream, and mechanism for actuating said knives and said impellers in proper time relation.

11. Apparatus for forming gobs from a molten stream of vitreous material comprising a slotted cutting block mounted adjacent the path of travel of the stream having passages therein for the circulation of a cooling fluid, a rotatable turret mounted adjacent thereto, a plurality of knives mounted on said turret and arranged to be moved by said turret through the path of travel of the stream and the slot in the cutting block at succeeding intervals to sever said stream into gobs, a pair of impellers located at opposite sides of a gob formed in this manner and having a passage for conducting a cooling fluid therethrough, and means for actuating the impellers to cause them to engage the gob and accelerate its movement in the normal direction of travel of the stream to a speed appreciably greater than that of the stream, and mechanism for actuating said knives and said impellers in proper time relation.

12. Apparatus of the class described comprising a rotatably mounted turret member, at least one radially and horizontally extending knife mounted on said turret, and a cutting block mounted in the rotary path of said knife and having a horizontal slot therein for passage of the knife, said cutting block being further provided with a vertical opening for passage of a stream of molten glass therethrough, said opening intersecting said slot, a pair of impellers located just below said opening so as to be on opposite sides of a gob of glass severed from said stream, and means for actuating said impellers to cause them to grip the gob and accelerate its downward movement to a speed appreciably greater than that of the glass stream.

CARL A. BROWN.
CHARLES W. CRAIG.